US012689482B2

(12) United States Patent (10) Patent No.: US 12,689,482 B2
Mei et al. (45) Date of Patent: Jul. 21, 2026

(54) REFERENCE SIGNAL PORT INDICATION TECHNIQUES

(71) Applicant: ZTE Corporation, Shenzhen (CN)

(72) Inventors: Meng Mei, Shenzhen (CN); Bo Gao, Shenzhen (CN); Shujuan Zhang, Shenzhen (CN); Ke Yao, Shenzhen (CN); Yang Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 336 days.

(21) Appl. No.: 18/516,056

(22) Filed: Nov. 21, 2023

(65) Prior Publication Data

US 2024/0089060 A1     Mar. 14, 2024

Related U.S. Application Data

(63) Continuation of application No. PCT/CN2022/090035, filed on Apr. 28, 2022.

(51) Int. Cl.
H04L 5/00 (2006.01)
H04J 13/00 (2011.01)
H04L 1/00 (2006.01)

(52) U.S. Cl.
CPC .......... H04L 5/0051 (2013.01); H04J 13/004 (2013.01); H04L 1/0068 (2013.01)

(58) Field of Classification Search
CPC ..... H04L 5/0051; H04L 1/0068; H04L 5/001; H04L 5/0016; H04L 5/0023; H04L 25/0226; H04L 5/0048; H04J 13/004
See application file for complete search history.

(56) References Cited

U.S. PATENT DOCUMENTS

| | | | |
|---|---|---|---|
| 2018/0026684 A1 | 1/2018 | Wei et al. | |
| 2019/0013916 A1 | 1/2019 | Jin et al. | |
| 2020/0178281 A1 | 6/2020 | Bhamri et al. | |
| 2021/0105117 A1 | 4/2021 | Abdelghaffar et al. | |
| 2023/0189264 A1 | 6/2023 | Choi et al. | |
| 2024/0275653 A1* | 8/2024 | Zhang ................... | H04L 5/0016 |
| 2025/0056556 A1* | 2/2025 | Jacobsson ........... | H04W 72/231 |

FOREIGN PATENT DOCUMENTS

| | | |
|---|---|---|
| CN | 103209490 A | 7/2013 |
| CN | 106470087 A | 3/2017 |
| CN | 108111266 A | 6/2018 |
| CN | 109391414 A | 2/2019 |
| WO | 2017142643 A1 | 8/2017 |

(Continued)

OTHER PUBLICATIONS

International Search Report and Written Opinion for International Application No. PCT/CN2022/090035, mailed on Nov. 25, 2022 (9 pages).

(Continued)

*Primary Examiner* — Thai Nguyen
(74) *Attorney, Agent, or Firm* — Perkins Coie LLP

(57) ABSTRACT

Techniques are described to indicate reference signal port. An example wireless communication method includes determining, by a communication device, a demodulation reference signal (DMRS) port and at least one type of an orthogonal code; and receiving, by the communication device at the DMRS port, a DMRS based on the at least one type of the orthogonal code.

20 Claims, 12 Drawing Sheets

Determining, by a communication device, a demodulation reference signal (DMRS) port and at least one type of an orthogonal code — 1102

Receiving, by the communication device at the DMRS port, a DMRS based on the at least one type of the orthogonal code — 1104

(56)                  References Cited

FOREIGN PATENT DOCUMENTS

| WO | 2022/031120 | A1 |   | 2/2022 | | |
| WO | WO-2023170658 | A1 | * | 9/2023 | .......... | H04L 5/0016 |

OTHER PUBLICATIONS

ZTE, "Remaining issues in DMRS mapping," 3GPP TSG RAN WG1 #60bis, Beijing, China, R1-101829, Apr. 12-16, 2010, 4 pages.

ZTE, "DMRS enhancement for UL/DL MU-MIMO and 8 Tx UL SU-MIMO," 3GPP TSG RAN WG1 #109-e, R1-2203266, e-Meeting, May 9-20, 2022 ( 6 pages).

Fraunhofer IIS, "Increased number of orthogonal DMRS ports," 3GPP TSG RAN WG1 Meeting #109-e, R1-2204677, E-meeting, May 9-May 20, 2022 (6 pages).

Samsung, "Views on DMRS enhancements," 3GPP TSG RAN WG1#109-e, R1-2203891, e-Meeting, May 9-May 20, 2022 (11 pages).

Xiaomi, "Unified TCI framework extension for multi-TRP," 3GPP TSG RAN WG1 #109-e, R1-2203796, e-Meeting, May 9-20, 2022 (14 pages).

CMCC, "Discussion on increased number of orthogonal DMRS ports," 3GPP TSG RAN WG1 #109-e, R1-2204290, e-Meeting, May 9-20, 2022 (3 pages).

Huawei et al., "Enhancements on DMRS in Rel-18," 3GPP TSG-RAN WG1 Meeting #109-e, R1-2203152, e-Meeting, May 9-May 20, 2022 (15 pages).

Ericsson, "Remaining details on DMRS design," 3GPP TSG RAN WG1 Meeting 91, R1-1720736, Reno, USA, Nov. 27-Dec. 1, 2017 (15 pages).

Mediatek, Inc., "Low PAPR RS," 3GPP TSG RAN WG1 Meeting #94bis, R1-1810437, Chengdu, China, Oct. 8-12, 2018 (12 pages).

Huawei et al., "Signaling of DMRS ports for SU/MU-MIMO," 3GPP TSG RAN WG1 NR Ad-Hoc#3, R1-1715599, Nagoya, Japan, Sep. 18-21, 2017 (14 pages).

LG Electronics, "Increased number of orthogonal DMRS ports," 3GPP TSG RAN WG1 #109-e, R1-2204144, e-Meeting, May 9-20, 2022 (4 pages).

Extended European Search Report for European Patent Application No. 22939125.5, mailed Jun. 27, 2024 (7 pages).

* cited by examiner

1102

Determining, by a communication device, a demodulation reference signal (DMRS) port and at least one type of an orthogonal code

1104

Receiving, by the communication device at the DMRS port, a DMRS based on the at least one type of the orthogonal code

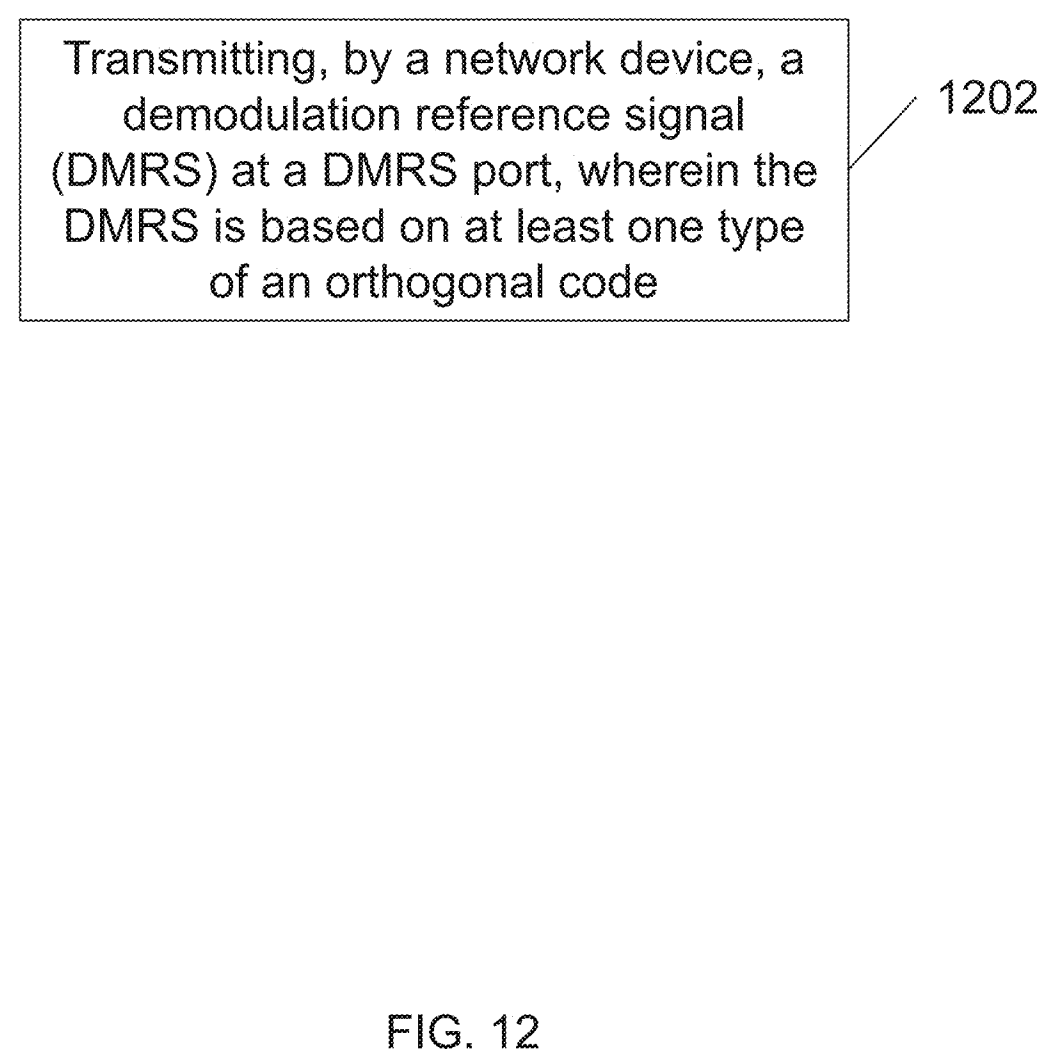

1202

Transmitting, by a network device, a demodulation reference signal (DMRS) at a DMRS port, wherein the DMRS is based on at least one type of an orthogonal code

FIG. 12

REFERENCE SIGNAL PORT INDICATION TECHNIQUES

CROSS REFERENCE TO RELATED APPLICATIONS

This patent document is a continuation of and claims benefit of priority to International Patent Application No. PCT/CN2022/090035, filed on Apr. 28, 2022. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for indicating reference signal port, such as a demodulation reference signal (DMRS) port.

A first wireless communication method includes determining, by a communication device, a demodulation reference signal (DMRS) port and at least one type of an orthogonal code; and receiving, by the communication device at the DMRS port, a DMRS based on the at least one type of the orthogonal code.

In some embodiments, the at least one type of the orthogonal code includes a length of the orthogonal code. In some embodiments, the at least one type of the orthogonal code includes: a first orthogonal cover code (OCC) of a first length of 4, a second OCC of a second length of 2, or a third OCC of a third length of 6. In some embodiments, the at least one type of the orthogonal code is determined according to an indication received in a signaling which includes at least one of a radio resource control (RRC) signaling, a medium access control-control element (MAC CE) signaling, or a downlink control information (DCI) signaling. In some embodiments, the indication indicates the at least one type of an orthogonal code. In some embodiments, the indication indicates at least one of the DMRS port index, a number of physical resource blocks (PRBs) for the DMRS port, the size of PRB group (PRG), a bandwidth part (BWP) for the DMRS port, a plurality of PRBs of one PRG, or a plurality of PRGs of one PRG group. In some embodiments, the communication device determines the DMRS port according to at least one of a DMRS port index, a number of physical resource blocks (PRBs) of channel for the DMRS port, a size of PRG, a bandwidth part (BWP) of channel of the DMRS port, a plurality of PRBs of one PRB group (PRG), a plurality of PRGs of one PRG group, or a DMRS pattern type of the DMRS port.

In some embodiments, the type of the orthogonal code is at least one of: in response to the number of PRBs for the DMRS port in one PRG or PRG group being odd, the type of the orthogonal code in the PRG or PRG group is 2; in response to the number of PRBs for the DMRS port in one PRG or PRG group being odd, the type of the orthogonal code in the PRG is 6; in response to the number of the PRB for the DMRS port in one PRG or PRG group being even, the type of the orthogonal code in the PRG or PRG group is 4; a first 4 REs for mapping the DMRS port using a orthogonal code of length 4; a last 2 REs for mapping the DMRS port using a orthogonal code of length 2; a last PRB in one PRG for mapping the DMRS port with a orthogonal code of length 2; a last PRB in one PRG for mapping the DMRS port with a orthogonal code of length 6; or a group of PRBs in one PRG except for the last PRB for mapping the DMRS port with a orthogonal code of length 4. In some embodiments, the indication is received in a downlink control information (DCI), and the indication includes a 1-bit value in a DCI field, or the indication includes a reserved bit associated with the DMRS port, or the indication includes a reserved bit associated with the DCI field.

In some embodiments, a physical resource block (PRB) bundling for the DMRS port is performed on at least one of: a configured bandwidth part (BWP), scheduling PRBs, a plurality of PRBs of one PRB group (PRG), or a plurality of PRGs of one PRG group. In some embodiments, an even number of PRBs are included in each PRG, wherein the DMRS port in the PRG with a first OCC of length 4. In some embodiments, a start point of the PRB bundling is a first PRB allocated to the communication device, or a first PRB in the configured BWP, or a first PRB in a PRG. In some embodiments, the DMRS port with different types of frequency division orthogonal cover code (FD-OCC) are mapped on resources in frequency domain. In some embodiments, the resources include: different physical resource block groups (PRGs), different PRG groups, scheduled PRBs for the communication device, a set of PRBs without PRB bundling, or partial resource elements (REs) on a set of PRBs without PRB bundling. In some embodiments, the DMRS port with frequency division orthogonal cover code (FD-OCC) of length of 4 on resources include any one of: puncturing on the resources, or a plurality of DMRS ports on the resources are associated with a FD-OCC of length 2 as a same DMRS port, or using associated FD-OCC of length 2.

In some embodiments, the plurality of DMRS ports on the resources associated with a FD-OCC of length 2 as a same DMRS port, an index of the DMRS port is 0 to 3 for a single symbol DMRS, or the index of the DMRS port is 0 to 7 for a double symbol DMRS. In some embodiments, an index of the DMRS port is larger than 3 for a single symbol DMRS, or the index of the DMRS port is larger than 7 for a double symbol DMRS. In some embodiments, the two values of the second OCC are associated with any two of the four values of the first OCC. In some embodiments, the two values of the second OCC are one of: first two values of the four values of the first OCC, or last two values of the four values of the first OCC. In some embodiments, the DMRS include at least one of: a type I DMRS; the DMRS port associated with FD-OCC of length 4; the DMRS port is associated with FD-OCC of length 4 indicated by a signaling.

A second wireless communication method includes transmitting, by a network device, a demodulation reference signal (DMRS) at a DMRS port, wherein the DMRS is based on at least one type of an orthogonal code.

In some embodiments, the at least one type of the orthogonal code includes a length of the orthogonal code. In some embodiments, the at least one type of the orthogonal code includes: a first orthogonal cover code (OCC) of a first length of 4, a second OCC of a second length of 2, or a third OCC of a third length of 6. In some embodiments, the at least one type of the orthogonal code is determined according to an indication transmitted in a signaling which includes at least one of a radio resource control (RRC) signaling, a medium access control-control element (MAC CE) signaling, or a downlink control information (DCI) signaling. In some embodiments, the indication indicates the at least one type of an orthogonal code. In some embodiments, the indication indicates at least one of the DMRS port index, a number of physical resource blocks (PRBs) for the DMRS port, the size of PRB group (PRG), a bandwidth part (BWP) for the DMRS port, a plurality of PRBs of one PRG, or a plurality of PRGs of one PRG group. In some embodiments, the indication is transmitted in a downlink control information (DCI), and the indication includes a 1-bit value in a DCI field, or the indication includes a reserved bit associated with the DMRS port, or the indication includes a reserved bit associated with the DCI field.

In some embodiments, a physical resource block (PRB) bundling for the DMRS port is performed on at least one of: a configured bandwidth part (BWP), scheduling PRBs, a plurality of PRBs of one PRB group (PRG), or a plurality of PRGs of one PRG group. In some embodiments, an even number of PRBs are included in each PRG, wherein the DMRS port in the PRG with a first OCC of length 4. In some embodiments, a start point of the PRB bundling is a first PRB allocated to the communication device, or a first PRB in the configured BWP, or a first PRB in a PRG. In some embodiments, the DMRS port with different types of frequency division orthogonal cover code (FD-OCC) are mapped on resources in frequency domain. In some embodiments, the resources include: different physical resource block groups (PRGs), different PRG groups, scheduled PRBs for the communication device, a set of PRBs without PRB bundling, or partial resource elements (REs) on a set of PRBs without PRB bundling.

In some embodiments, the DMRS port with frequency division orthogonal cover code (FD-OCC) of length of 4 on resources include any one of: puncturing on the resources, or a plurality of DMRS ports on the resources are associated with a FD-OCC of length 2 as a same DMRS port, or using associated FD-OCC of length 2. In some embodiments, the plurality of DMRS ports on the resources associated with a FD-OCC of length 2 as a same DMRS port, an index of the DMRS port is 0 to 3 for a single symbol DMRS, or the index of the DMRS port is 0 to 7 for a double symbol DMRS. In some embodiments, an index of the DMRS port is larger than 3 for a single symbol DMRS, or the index of the DMRS port is larger than 7 for a double symbol DMRS.

In some embodiments, the two values of the second OCC are associated with any two of the four values of the first OCC. In some embodiments, the two values of the second OCC are one of: first two values of the four values of the first OCC, or last two values of the four values of the first OCC. In some embodiments, the DMRS include at least one of: a type I DMRS; the DMRS port associated with FD-OCC of length 4; the DMRS port is associated with FD-OCC of length 4 indicated by a signaling.

In some embodiments, a communication device determine a pre-defined rule that identifies a demodulation reference signal port, where the indication is associated with at least one type of an orthogonal code; and receiving, by the communication device at the demodulation reference signal port, a demodulation reference signal based on the at least one type of the orthogonal code.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 12 shows an exemplary flowchart for transmitting a demodulation reference signal.

DETAILED DESCRIPTION

In the uplink or downlink transmission, more than 8 or 12 demodulation reference signal (DMRS) ports may be supported. New DMRS pattern should be designed, and the DMRS port should also be indicated to UE. In current specification, only 8 or 12 DMRS ports are supported, and how to support more DMRS ports should be considered.

The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Introduction

Figure 1:
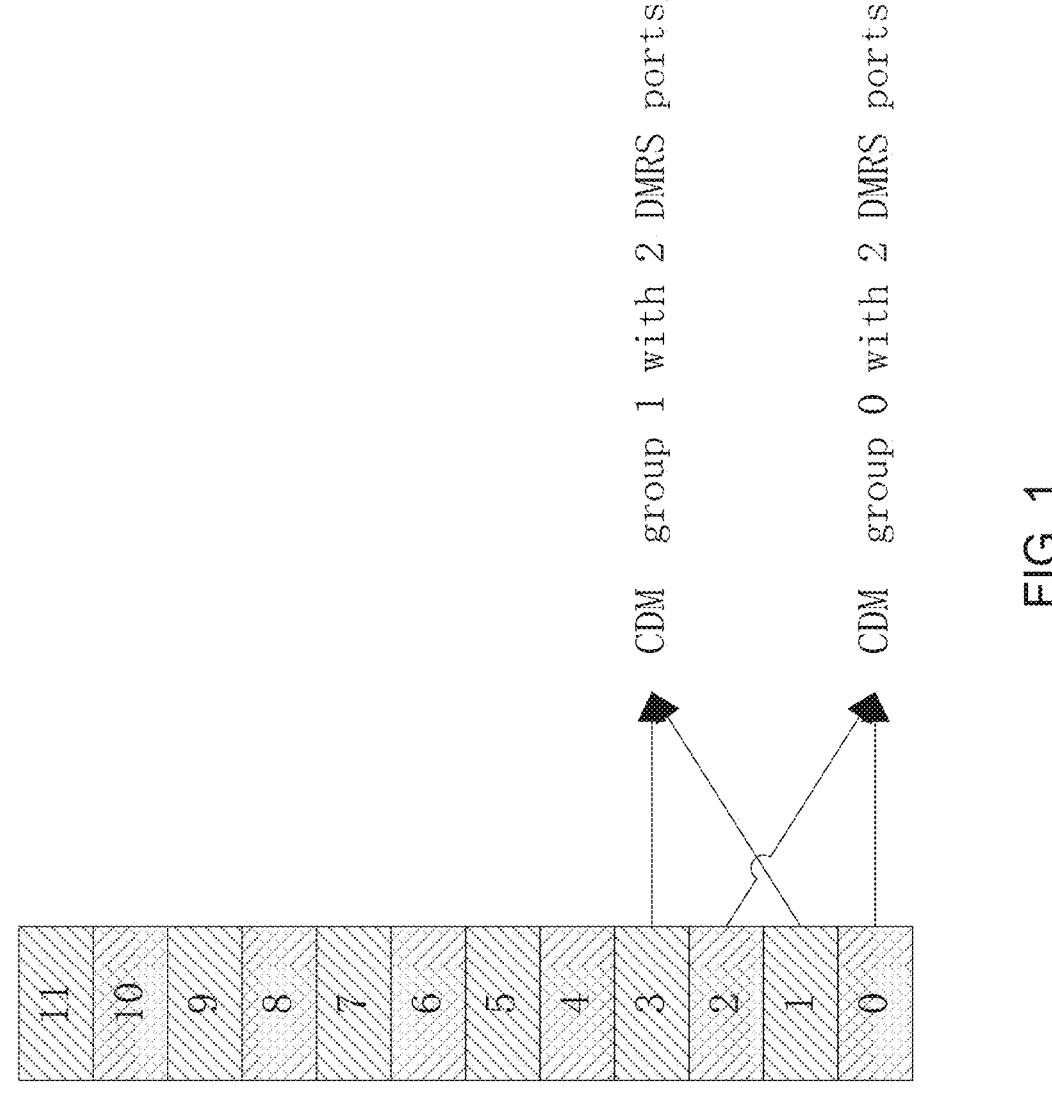
FIG. 1 shows a demodulation reference signal (DMRS) type 1 with 1 front loaded DMRS symbol.

In the initial releases of NR, two DMRS types are supported named as DMRS type 1 and DMRS type 2. FIG. 1 shows a DMRS type 1 with 1 front loaded DMRS symbol (single symbol DMRS), and FIG. 2 shows DMRS type 1 with 2 front loaded DMRS symbols (double symbol DMRS).

FIG. 1 shows the DMRS pattern for DMRS type 1 within one physical resource block (PRB) in the case when one front loaded DMRS symbol is configured by RRC signaling or indicated by DCI signaling, where two comb frequency resource elements (REs) form one DMRS code division multiplexing (CDM) group. Specifically, DMRS port 0 and 1 are multiplexed in CDM group #0, e.g., port 0 and port1 are multiplexed in RE #0 and RE #2 in CDM manner, and port 0 and port 1 are also multiplexed in RE #4 and RE #6, RE #8 and RE #10 in CDM manner. So CDM group #0 are repeated three times where one is in RE #0 and #2, and the other one is in RE #4 and #6, and RE #8 and RE #10. Similar mapping for other DMRS ports. In summary, 4 DMRS ports are supported in the case of one front loaded DMRS symbol, and the density of each DMRS port is 6 REs per PRB per symbol.

Figure 2:
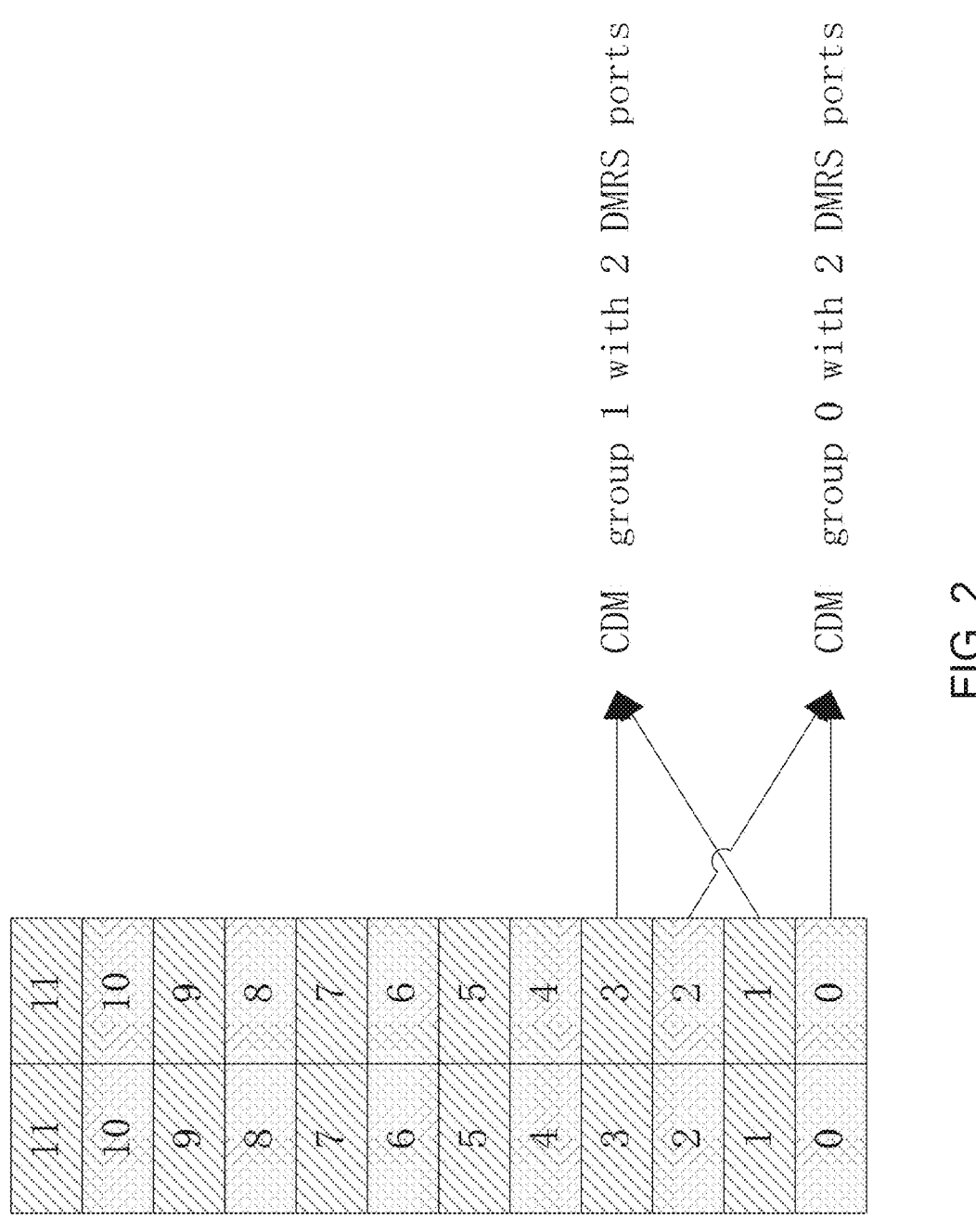
FIG. 2 shows DMRS type 1 with 2 front loaded DMRS symbols.

FIG. 2 shows the DMRS pattern for DMRS type 1 within one PRB in the case when two front loaded DMRS symbols are configured by RRC signaling or indicated by DCI signaling, where four REs form one DMRS CDM group. Specifically, DMRS port 0, 1, 4 and 5 are multiplexed in CDM group #0 in CDM manner. Similar mapping for other DMRS ports. In summary, 8 DMRS ports are supported in the case of two front loaded DMRS symbols, and the density of each DMRS port is 12 REs per PRB per 2-symbols. It is noted that in one PRB, each CDM group maps three time2, e.g., CDM group #0 maps on RE #0, #1 and RE #4, #5, and also RE #8 and RE #10.

II. Example Embodiment #1

UE receive a DMRS port indication, where the UE can determine a type of OCC on the frequency domain based on the DMRS port indication The number of type of OCC on the frequency domain contains at least one of:

OCC length of 4; or

OCC of length 2.

In the frequency domain, such as all the scheduling PRBs or in one PRB group (PRG), different types of OCC can be used for one DMRS port. That means for at least one DMRS port mapping on the BWP or on the scheduling PRBs or PRBs in one PRG, different OCC length can be used, some of the PRBs or REs are used to map the DMRS ports with OCC of length 4 and some other REs or PRBs are used to map the DMRS ports with OCC of length 2.

Figure 4:
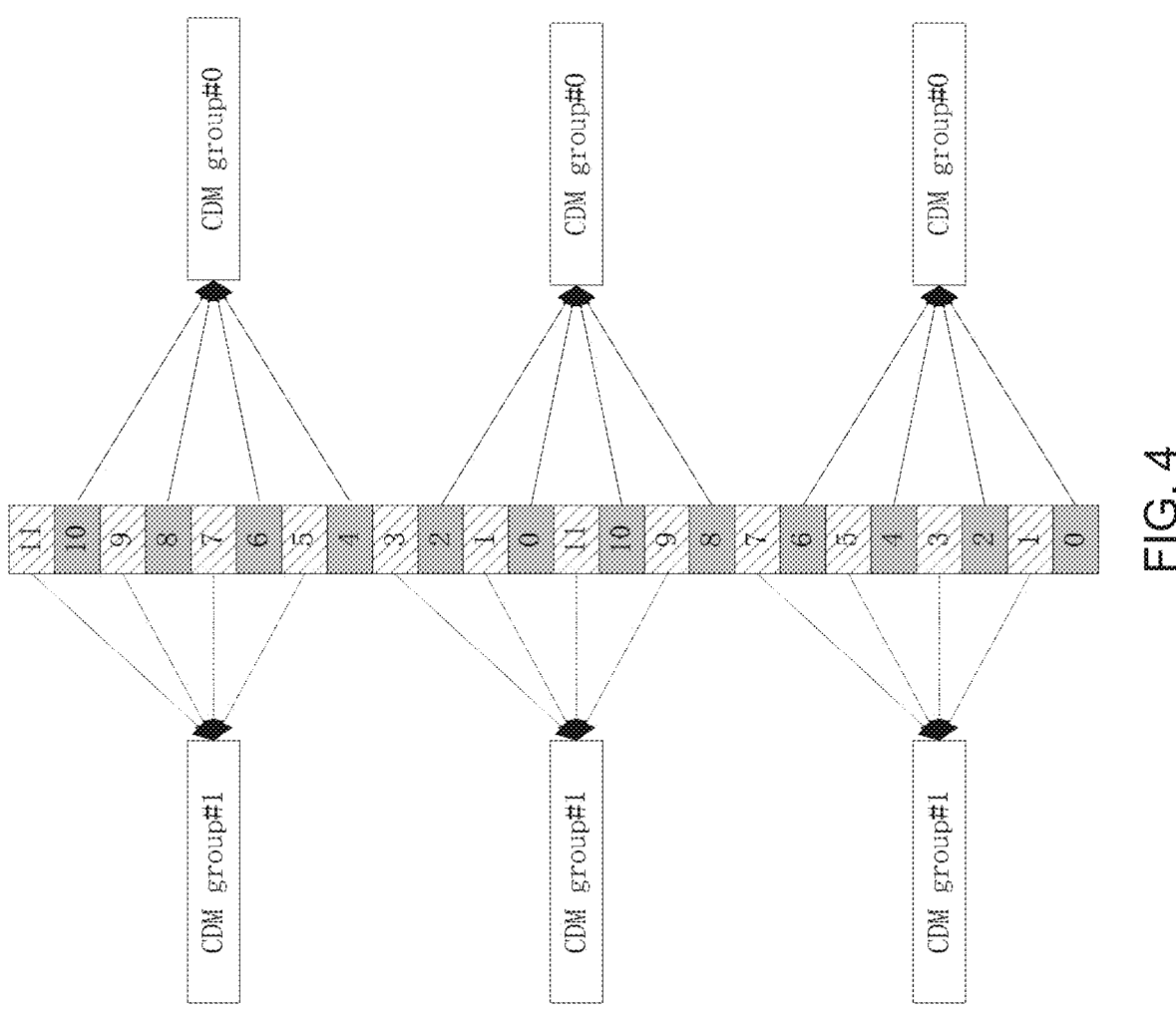
FIG. 4 shows an example DMRS pattern for physical resource block (PRB) bundling.

Such as for DMRS type 1, for legacy DMRS port, one DMRS port is mapped on 6 REs on one PRB, if frequency domain orthogonal covered code (FD-OCC) of length 4 is used, 6 REs cannot be divided into times of 4, and PRB bundling for the scheduling PRB or in each PRG or in the BWP should be used, as shown in FIG. 4.

So 2 PRBs can be bundled and mapped the DMRS ports of one CDM group across the bundling PRBs. The bundling size can be 2 or 4 or even larger numbers, but should be even.

If the number of scheduling PRB for one DMRS port mapped on or in any one of PRG is odd, that means there will be one PRB without PRB bundling, and in this PRB 6REs is used for mapping the DMRS ports with FD-OCC of length 4.

The PRB can be bundled from the lowest or the highest ID of the PRB in each PRG or all the scheduled PRBs or even the BWP.

If the PRB is bundled from the lowest PRB, the highest PRB or the last two REs of one CDM group in the highest PRB may not used for mapping of DMRS ports with FD-OCC of length 4.

Figure 5:
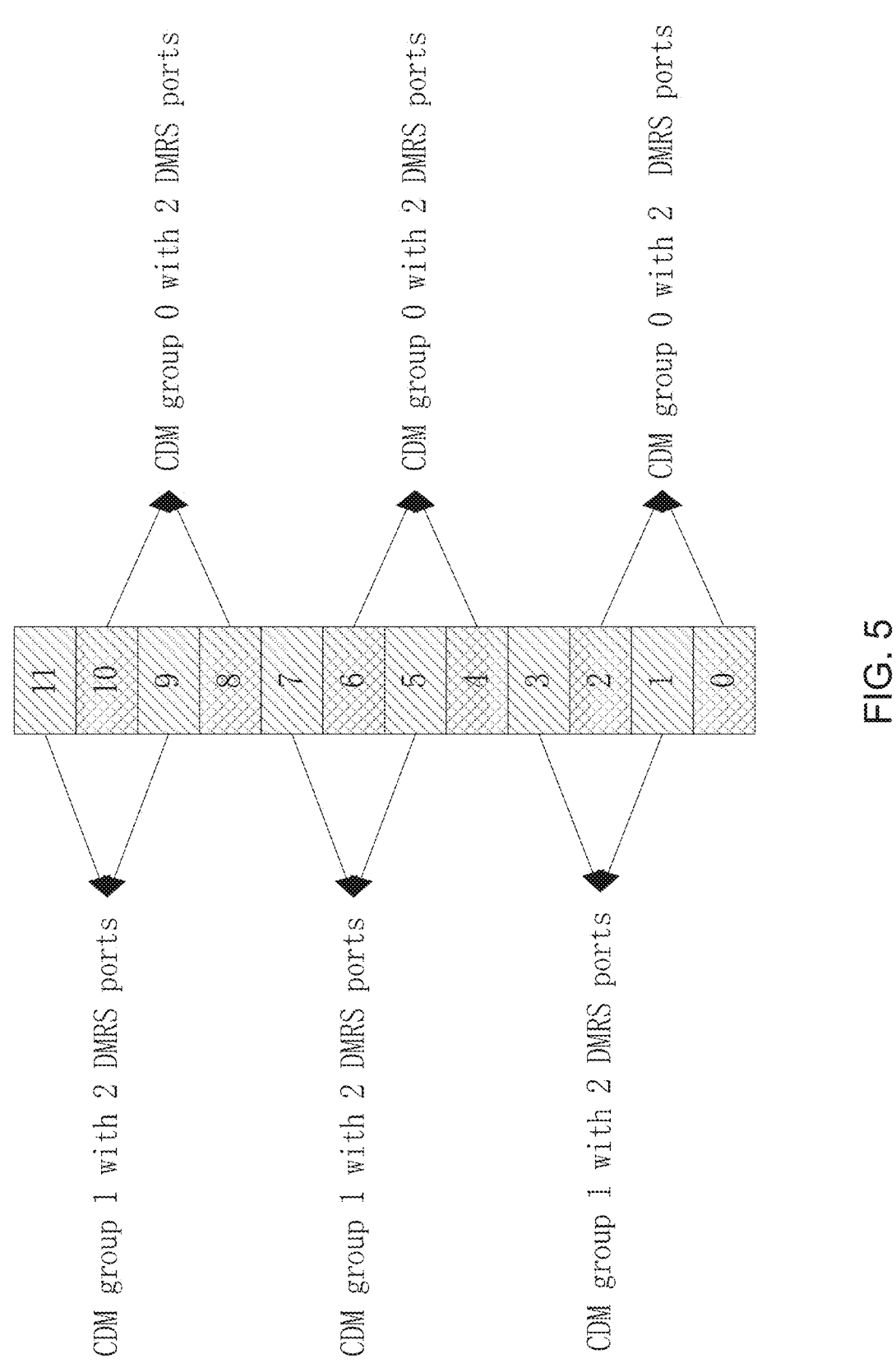
FIG. 5 shows an example DMRS pattern with FD-OCC of length 2 in the PRB without bundling.

So the DMRS ports mapped on the PRB without PRB bundling in the all the scheduling PRBs or in one PRG or the BWP, should use frequency division orthogonal cover code (FD-OCC) of length 2, as shown in FIG. 5. That means the PRB without PRB bundling maps the DMRS ports that fall back to use the legacy FD-OCC of length 2. And the FD-OCC value is the same as the legacy FD-OCC associated with the DMRS port index.

Or the left numbers of REs for one CDM group without bundling is used to map DMRS ports with FD-OCC of length 2, as shown in FIG. 5. The first 8 REs can be used to map the DMRS ports of the two CDM groups with FD-OCC of length 4. but the last 4 REs can be used to map the DMRS port of the two CDM groups with FD-OCC of length 2.

For DMRS ports with FD-OCC of length 4, up to 8 or 12 DMRS ports are supported for single symbol DMRS, and 16 or 24 DMRS ports are supported for double symbol DMRS.

If the DMRS port index smaller than 4 for single symbol DMRS or smaller than 4 for double symbol DMRS, that means the DMRS port can also be supported as a legacy index. When these DMRS ports are indicated, the DMRS port can be used as legacy DMRS port, e.g., with FD-OCC of length 2, in the PRBs or some of the REs in the corresponding CDM groups of the PRBs without bundling.

Figure 7:
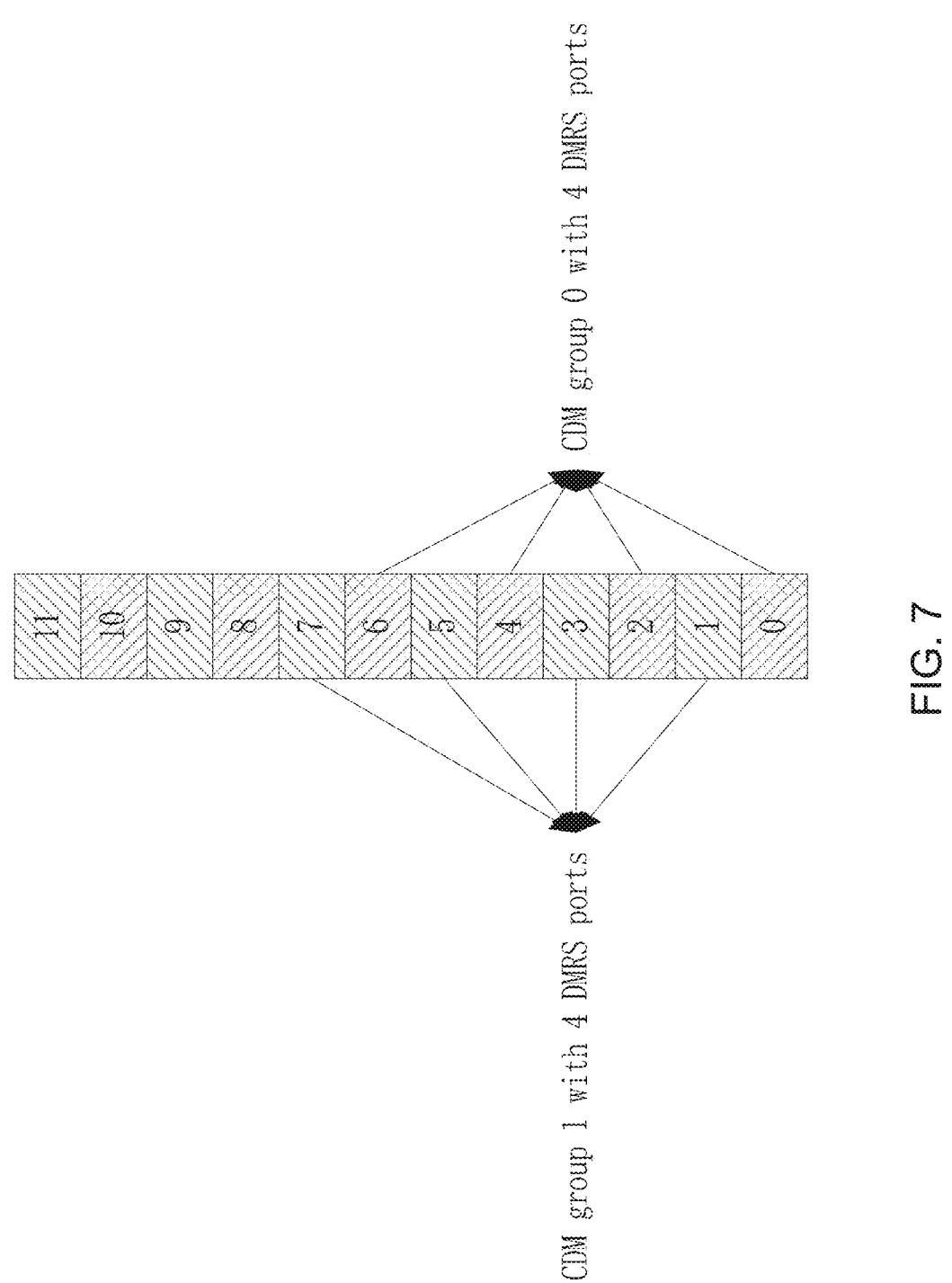
FIG. 7 shows an example DMRS pattern on partial resource elements (REs) of the PRB.

If the DMRS ports index is indicated larger than 4 for single symbol DMRS or larger than 8 for double symbol DMRS, the DMRS port should not be mapped on the PRB or the REs of the corresponding CDM groups of the related PRB without bundling, as shown in FIG. 7. FIG. 7 shows that in some embodiments only OCC with length 4 can be supported and other UEs is not used to map DMRS. Considering the DMRS port indicated as not the same as one legacy DMRS port, e.g., DMRS port with FD-OCC of length 2, these DMRS ports may not fall back to the legacy DMRS port, so partial or all the REs in the PRB without bundling should not be transmit. If all the REs may not be mapped with DMRS port, then the DMRS ports should not be mapped or puncturing on this PRB, if partial REs of this PRB is used to map DMRS and other REs are not used to map DMRS. In FIG. 7, the first 8 REs are used to map DMRS ports from two CDM groups with FD-OCC of length 4, and the last 4 REs are not used to map DMRS port.

Considering for DMRS ports with index larger than 4 for single symbol DMRS and 8 for double symbol DMRS or the number of DMRS port is indicated more than 2 in one CDM group for DMRS type 1, the DMRS ports mapped on the PRB without PRB bundling or partial REs of the PRB without PRB bundling can be used with a FD-OCC of length 2, wherein the FD-OCC of length 2 is from the FD-OCC of length 4. For example, if the DMRS port is indicated with a FD-OCC of [1,−1,1,−1], the first two or the last two values of the FD-OCC can be used for this DMRS port. If more DMRS ports are indicated in one CDM group, the FD-OCC of length 2 can be the values in the FD-OCC of length than are different from other values of the FD-OCC used for other DMRS port. So in such case, when DMRS ports are scheduled for one UE, the DMRS ports with different FD-OCC of the first two values should be indicated first, or have the higher priority, such as the DMRS ports with FD-OCC of [1,1,1,1] and [1,−1,1,−1] or [1,−1,−1,1];

Considering the case of different FD-OCC type used on one PRB, no matter PRB bundling is supported or not, this should be supported for the related PRBs, e.g., all the scheduling PRBs or the PRBs in one PRG. If PRB bundling is not supported, partial REs in one PRB are used for mapping DMRS ports with FD-OCC of length 4, and partial REs in one PRB are used for mapping DMRS ports with FD-OCC of length 2.

Figure 6:
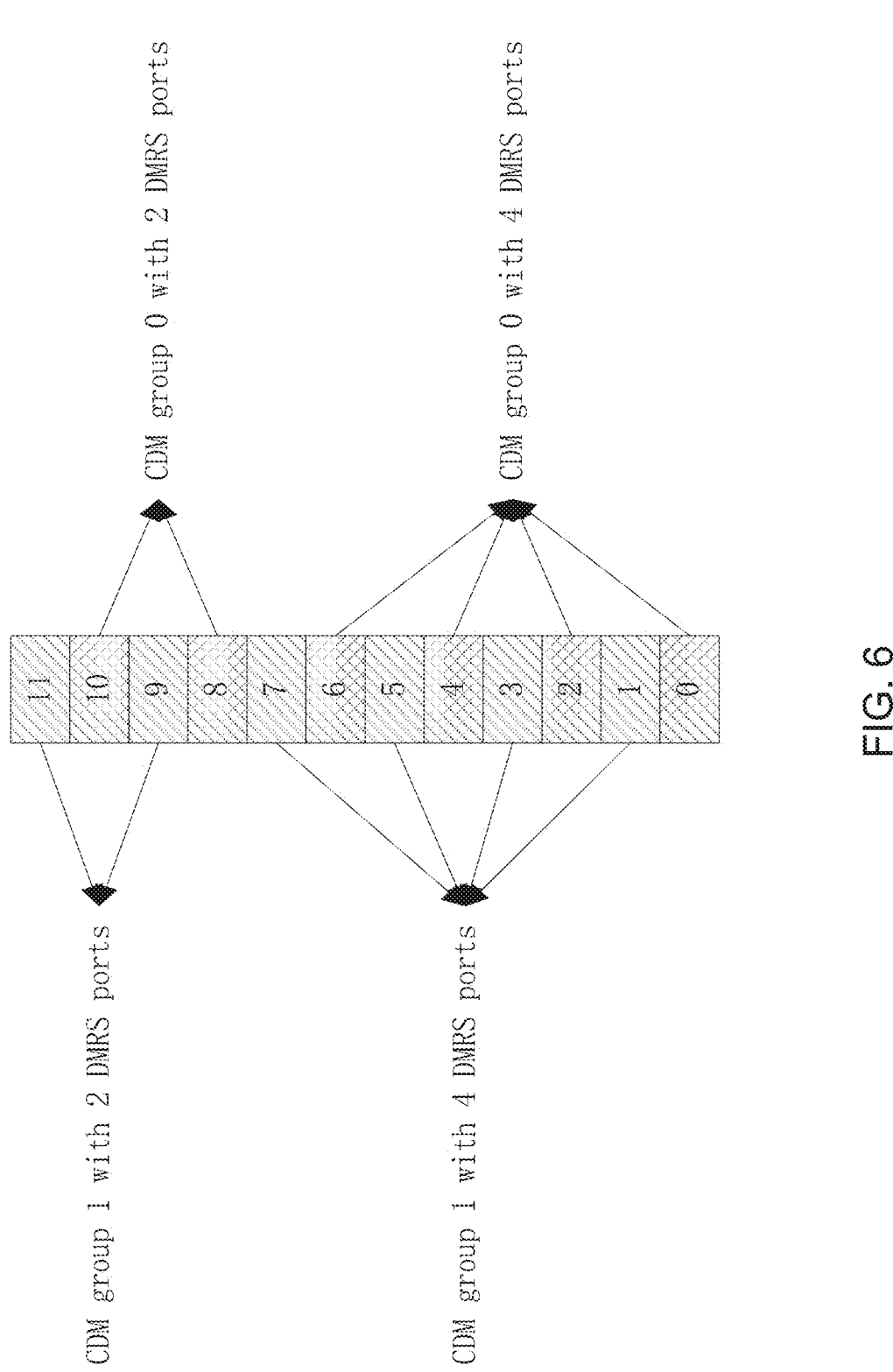
FIG. 6 shows an example DMRS pattern with different types of FD-OCC.
Figure 8:
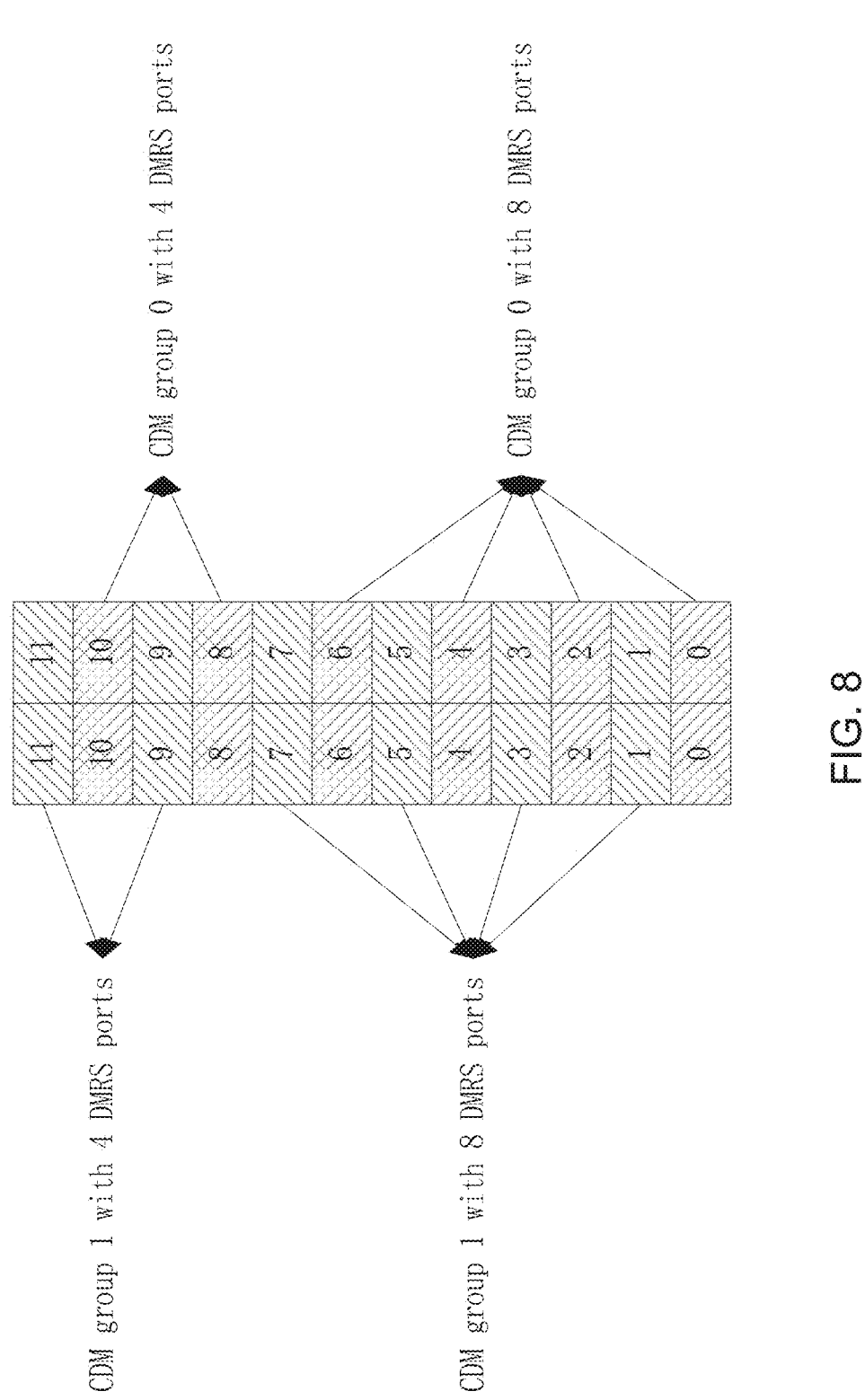
FIG. 8 shows an example double symbol DMRS with different types of FD-OCC.

For double symbol DMRS, DMRS ports are associated with FD-OCC and TD-OCC simultaneously, if FD-OCC with length 4 is supported, up to 8 DMRS ports are supported in one CDM group, and similarly to single symbol DMRS, different types of FD-OCC can also be used for double symbol DMRS, similarly to FIG. 6, the use case for double symbol DMRS can be shown in FIG. 8. different types of FD-OCC can be used on partial REs on the PRB or the scheduling PRBs in each PRG. FIG. 6 shows different types of OCC (e.g., length 4 and 2) are coexistence in one PRB.

III. Example Embodiment #2

PRB bundling for DMRS ports with FD-OCC of length 4 can be enabled by RRC signaling or MAC CE or DCI signaling.

If the RRC signaling configures that up to 24 DMRS ports are supported, or if RRC configures that DMRS ports are associated with FD-OCC of length 4, different type of FD-OCC can be used for DMRS ports in one CDM group. As mentioned before, different type of FD-OCC, e.g., with length 4 and with length 2, can be used for each scheduling PRB or PRB in the BWP or PRB in the PRG.

The RRC can also configure the PRB bundling enable or the bundling size in the BWP or in each PRG, if the bundling is enabled, the scheduling PRB number in each PRG should be even. Once the PRB bundling is configured, the DMRS ports can be mapped on the REs across the bundling PRBs.

Considering in some cases the PRB number in each PRG is odd, an indication should also be indicated to the UE, whether different types of FD-OCC can be used on PRB without PRB bundling or the last partial REs on the PRB without PRB bundling.

This indication can be at least one of: RRC signaling, MAC CE or DCI signaling.

For example, one bit in the DCI field can be used to indicate whether the PRB or partial REs of the PRB without PRB bundling.

So dynamic indication or switching between DMRS port with length 4 or length 2 in each PRG or the scheduling PRBs or on the BWP is supported.

Also considering the reserved bits in some DCI field, one bit or two values of the entry of this field can be used to indicate whether different types of FD-OCC can be used for one DMRS port, for example in the DMRS field.

DMRS ports with different types of FD-OCC (or different number of FD-OCC CDM groups) can be indicated by different index in the DCI field. For example, if the DMRS ports are configured as type 1 DMRS, different numbers of DMRS ports are support for single symbol DMRS or double symbol DMRS, e.g., up to 4 for single symbol DMRS and up to 8 for double symbol DMRS for legacy DMRS port. And the DMRS port index can be marked as DMRS port

0-3 for single symbol DMRS and DMRS port #0-7 for double symbol DMRS. And the new DMRS port with FD-OCC of length 4 or up to 4 DMRS group can be marked as a new index as #8-15 for single symbol DMRS and #8-24 for double symbol DMRS. So the indication of DMRS port can indicate the DMRS port is legacy DMRS port or new DMRS port (with FD-OCC of length 4 or 4 DMRS CDM groups with FD-OCC of length 2 in each group). If the DMRS port is indicate as an index of #0-7 the DMRS will be legacy DMRS port, otherwise the DMRS port will be new DMRS port. If the DMRS port is indicated larger than 7, PRB bundling is also indicated by the DMRS port indication.

One FD-OCC with length 2 can be also associated with one FD-OCC of length 4, for example as mentioned above, the first two values or the last two values of the FD-OCC of length 4. So, if different types if FD-OCC is used for one PRB or partial REs of one PRB in one PRG, the associated FD-OCC of length 2 can be used to modulate the DMRS ports with length 4 on these REs or RBs.

So, if some of the DMRS ports with FD-OCC of length 4 is indicated as the same index of legacy DMRS port, the OCC can fall back to legacy DMRS port with FD-OCC of length 2 with the same DMRS port index. If the DMRS port s with FD-OCC of length 4 is indicated with different index of legacy DMRS ports, the DMRS should not be mapped on the PRBs without PRB bundling, or partial REs on the PRB without PRB bundling. Wherein the number of REs in the partial REs is less than 4. or the DMRS port can be mapped on these PRBs or REs with the associated FD-OCC of length 2.

DMRS port with different types of FD-OCC can be mapped on related resources: The related resources can be one PRG or one PRG group. One or more PRBs can comprise one PRG, and one or more PRBs can comprise one PRG group. In some embodiments, configuration or indication from gNB is based on PRG or PRG group so that the configuration can be for one PRG or PRG group.

Different PRGs can be configured or pre-defined as one PRG group. For example, the PRGs with even number of PRBs and support PRB bundling in each PRG can be treated as one PRG and other PRGs with odd number of PRBs and do not support PRB bundling in each PRG can be treated as other PRG groups. Each PRG group include at least one PRG. If PRGs or PRG groups support PRB bundling, DMRS ports with FD-OCC of length 4 can be mapped on these PRGs or PRG groups, if PRGs or PRG groups with odd number of PRBs in each PRB, and do not support PRB bundling for DMRS port, DMRS ports with FD-OCC of length 2 can be mapped on these PRGs or PRG groups.

Considering different types can be mapped on different resources, for example, for the first OCC with length 4 can be mapped on the resources of number of PRBs or PRGs or PRG groups, and the second type of FD-OCC can be length 2 or 6, and the second type of FD-OCC can be for DMRS ports that mapped on some other resources.

The type of OCC for one DMRS port can be indicated by a signaling or just be pre-defined, or some rules. If one DMRS ports is indicated or configured for one UE, which resources are used to map the DMRS ports with different types of OCC can also be decided according to the indication or the rules. And the rule is similar to introduced above method for mapping the DMRS with different types of OCC on some resources introduced above.

Figure 3:
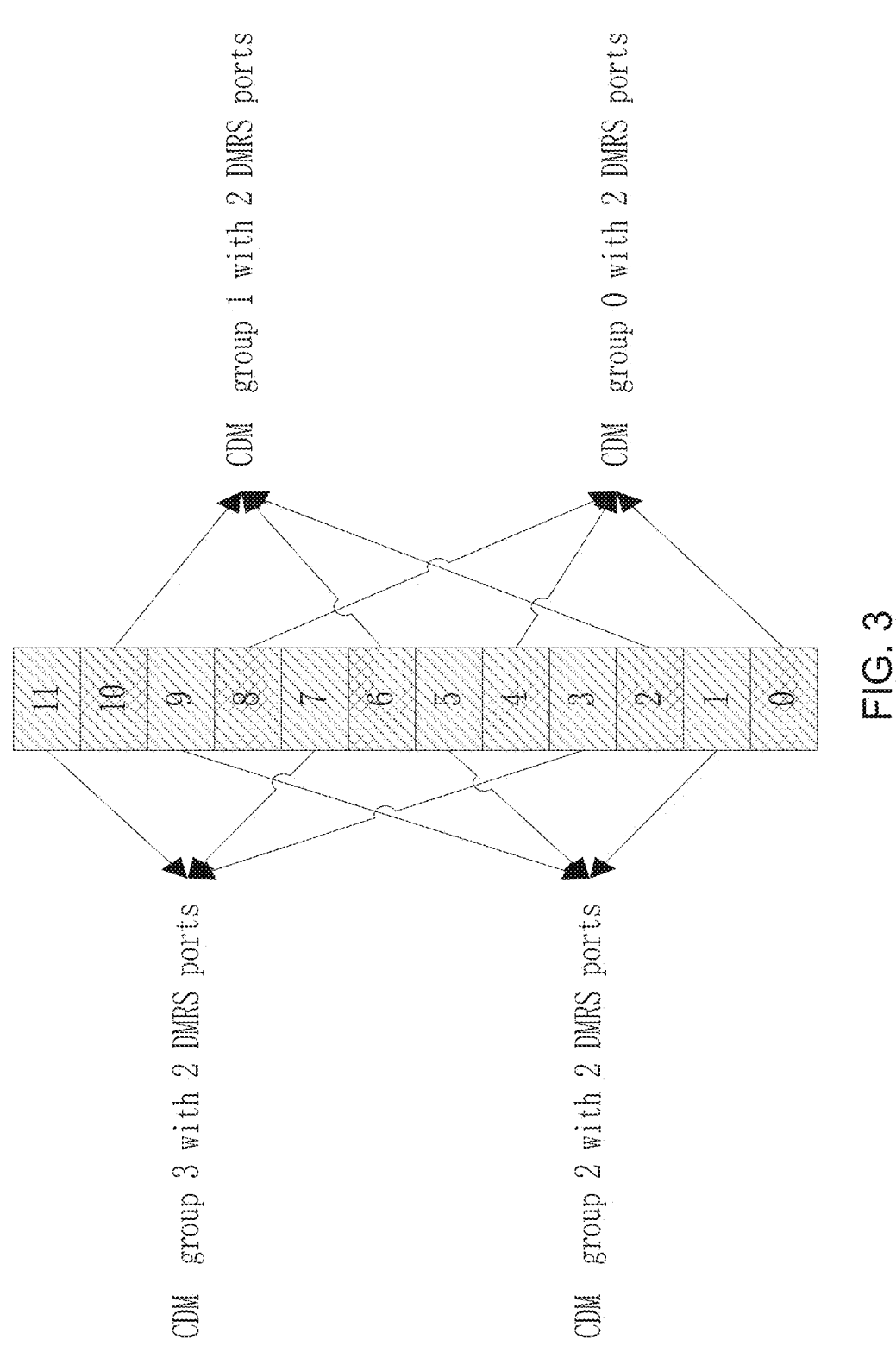
FIG. 3 shows frequency division orthogonal cover code (FD-OCC) with length 3 configured for up to two or three DMRS ports.

FIG. 3 shows FD-OCC with length 3 configured for up to two or three DMRS ports. FD-OCC with length 3 is configured or indicated by gNB, and up to 2 (or 3) DMRS ports can be supported in one CDM group, and for single symbol DMRS, four DMRS CDM groups can be supported and up to 8 (or 12) DMRS ports are supported for single symbol DMRS and up to 16 (or 24) DMRS ports are supported for double symbol DMRS as shown in FIG. 3.

One CDM group is mapped on the REs based on the formula:

$$a_{k,l}^{(p,\mu)} = w_f(k')w_t(l')r(L*n+k')$$

$$k = 12*n + 4*k' + \Delta, \text{ or}$$

$$k = (12*n + 4*k' + \Delta) \bmod 12 \text{ configuration type I}$$

$$k' = 0, 1, \ldots 2;$$

$$l = \bar{l} + l'$$

$$n = 0, 1 \ldots$$

where $w_f$ and $w_t$ are related the OCC in the frequency domain and time domain respectively and k' and l are related the REs and the symbols in the frequency domain and time domain respectively, and A relates to the CDM group. For example, for CDM group #0, A equals to 0, for CDM group #1, A equals to 2, for CDM group #2, A equals to 0, for CDM group #3, A equals to 3. Or for CDM group #0, A equals to 0, for CDM group #1, A equals to 1, for CDM group #2, A equals to 2, for CDM group #3, A equals to 3.

This patent document describes several example techniques for indicating DMRS port information. In some embodiments, the UE receives a DMRS port indication, where the UE can determine a type of OCC on the frequency domain based on the DMRS port indication. The following are examples description of the indication or type of OCC or DMRS ports as explained in this patent document:

The type of OCC on the frequency domain contains at least one of (or any one or more of):
OCC length of 4;
OCC of length 2; or
4 CDM groups with OCC length of 2
The indication can be at least one of: RRC, MAC CE or DCI
The indication can be the DMRS port index in the DMRS port indication field
The indication can be 1 bit in DCI field or the reserved bit in the DMRS port or the reserved bit in the DCI field.
The indication is used for DMRS type-1.
The indication includes an information of PRB bundling on at least one of: configured BWP, scheduling PRBs or PRBs of one PRG.
The PRB in each PRG should be even
Reference point of PRB bundling should be the first PRB allocated to UE or the first PRB in the BWP or the first PRB in each PRG. A reference point can be a start point can use PRB bundling, for example, if the reference point is the first PRB in the PRG then the PRB bundling will be used from the first PRB of the PRG.
DMRS port with different types of FD-OCC can be mapped on resources. The resources can be the PRBs or the REs mapped DMRS ports with different types of FD-OCC.
The related PRBs can be scheduled PRBs to UE or the PRBs without PRB bundling, or partial REs on the PRBs without PRB bundling
The OCC of length 2 is associated with OCC of length 4
Be the first 2 or last two values of OCC of length 4.

DMRS ports with FD-OCC of length 4 on related resource are at least one of:
Puncturing on the related resources
New DMRS ports on the related resources can be associated with same FD-OCC of length 2 as the legacy DMRS port.
The DMRS ports index is #0-3 for single symbol DMRS or #0-7 for double symbol DMRS for DMRS type-1.
Using the associated FD-OCC of length 2
The DMRS ports index is larger than 3 for single symbol DMRS or larger than 7 for double symbol DMRS for DMRS type-1.

Figure 9:
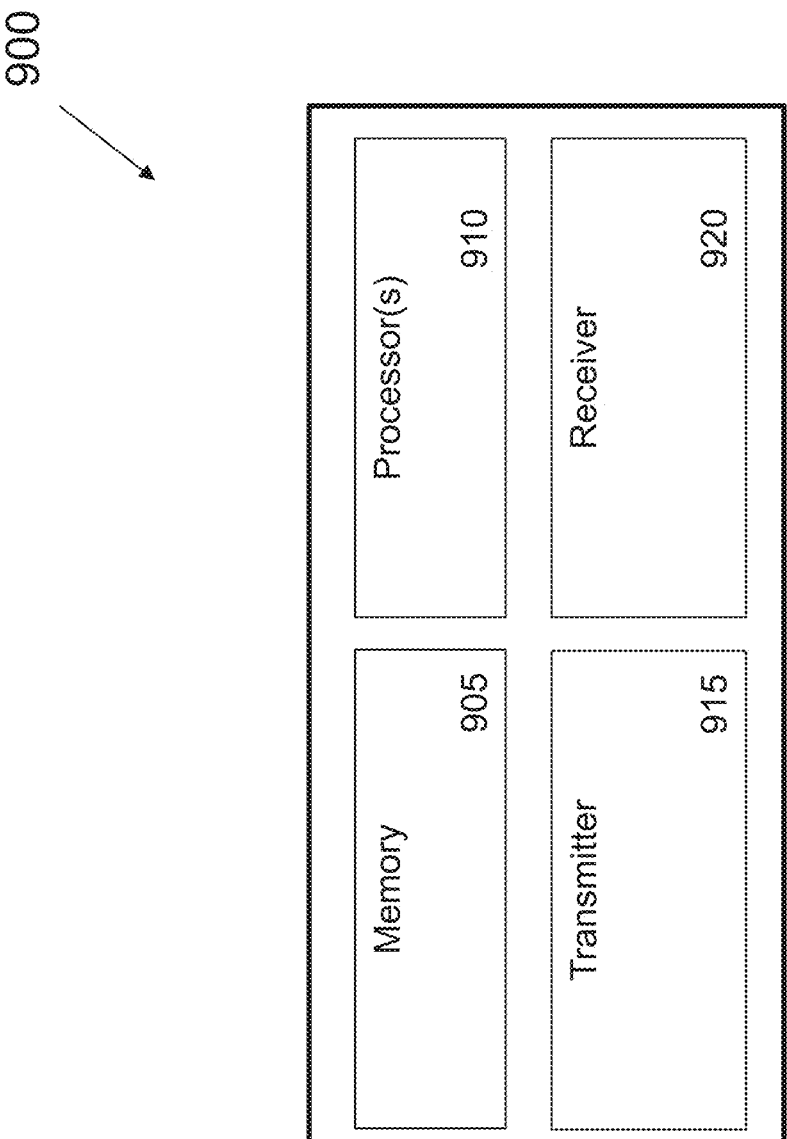
FIG. 9 shows an exemplary block diagram of a hardware platform that may be a part of a network device or a communication device.

FIG. 9 shows an exemplary block diagram of a hardware platform 900 that may be a part of a network device (e.g., base station) or a communication device (e.g., a user equipment (UE)). The hardware platform 900 includes at least one processor 910 and a memory 905 having instructions stored thereupon. The instructions upon execution by the processor 910 configure the hardware platform 900 to perform the operations described in FIGS. 1 to 8 and 10 to 12 and in the various embodiments described in this patent document. The transmitter 915 transmits or sends information or data to another device. For example, a network device transmitter can send a message to a user equipment. The receiver 920 receives information or data transmitted or sent by another device. For example, a user equipment can receive a message from a network device.

Figure 10:
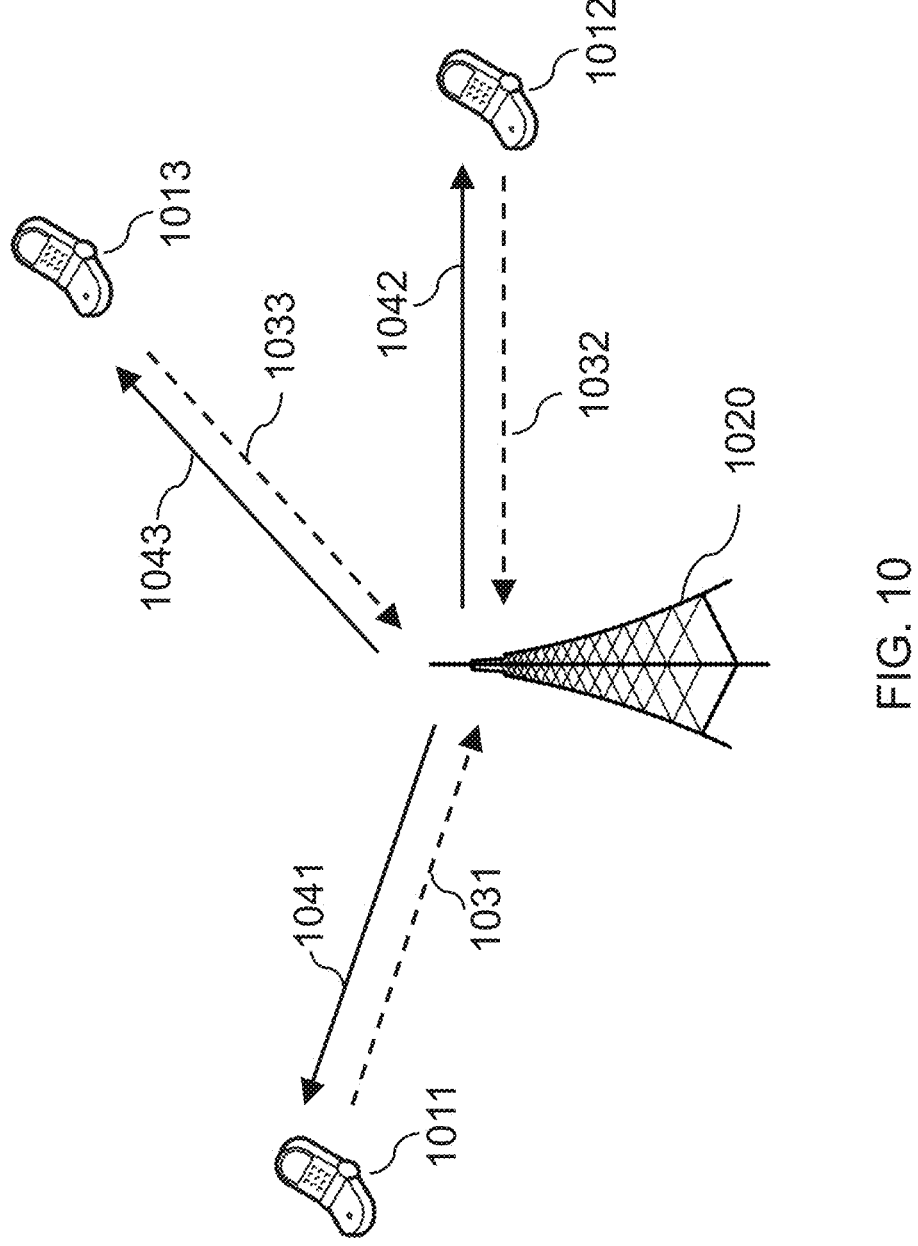
FIG. 10 shows an example of wireless communication including a base station (BS) and user equipment (UE) based on some implementations of the disclosed technology.

The implementations as discussed above will apply to a wireless communication. FIG. 10 shows an example of a wireless communication system (e.g., a 5G or NR cellular network) that includes a base station 1020 and one or more user equipment (UE) 1011, 1012 and 1013. In some embodiments, the UEs access the BS (e.g., the network) using a communication link to the network (sometimes called uplink direction, as depicted by dashed arrows 1031, 1032, 1033), which then enables subsequent communication (e.g., shown in the direction from the network to the UEs, sometimes called downlink direction, shown by arrows 1041, 1042, 1043) from the BS to the UEs. In some embodiments, the BS send information to the UEs (sometimes called downlink direction, as depicted by arrows 1041, 1042, 1043), which then enables subsequent communication (e.g., shown in the direction from the UEs to the BS, sometimes called uplink direction, shown by dashed arrows 1031, 1032, 1033) from the UEs to the BS. The UE may be, for example, a smartphone, a tablet, a mobile computer, a machine to machine (M2M) device, an Internet of Things (IoT) device, and so on.

Figure 11:
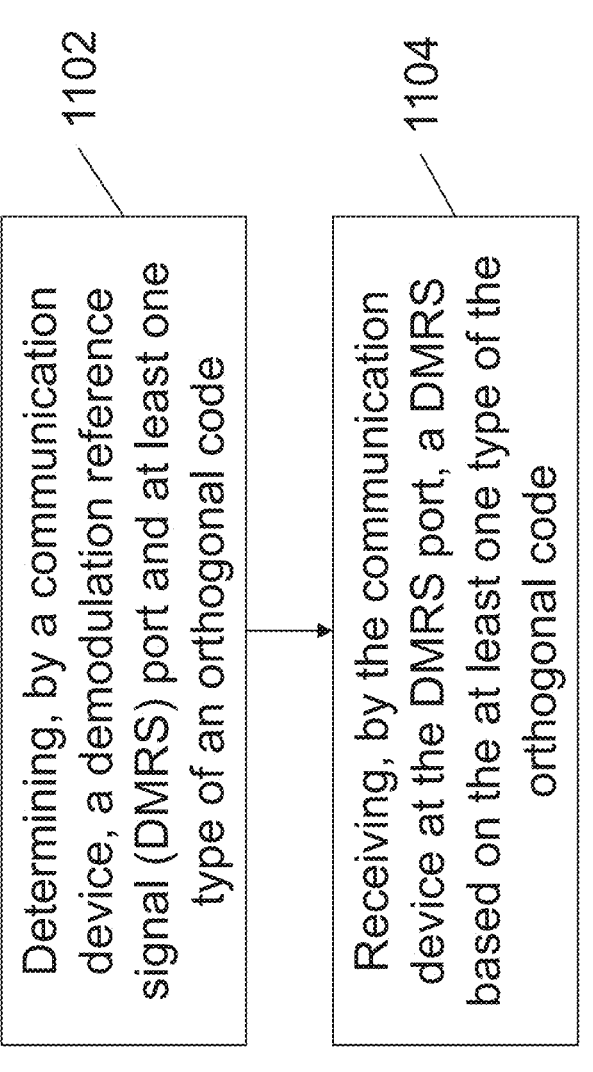
FIG. 11 shows an exemplary flowchart for receiving a demodulation reference signal.

FIG. 11 shows an exemplary flowchart for receiving a demodulation reference signal. Operation 1102 includes determining, by a communication device, a demodulation reference signal (DMRS) port and at least one type of an orthogonal code. Operation 1104 includes receiving, by the communication device at the DMRS port, a DMRS based on the at least one type of the orthogonal code.

In some embodiments, the at least one type of the orthogonal code includes a length of the orthogonal code. In some embodiments, the at least one type of the orthogonal code includes: a first orthogonal cover code (OCC) of a first length of 4, a second OCC of a second length of 2, or a third OCC of a third length of 6. In some embodiments, the at least one type of the orthogonal code is determined according to an indication received in a signaling which includes at least one of a radio resource control (RRC) signaling, a medium access control-control element (MAC CE) signaling, or a downlink control information (DCI) signaling. In some embodiments, the indication indicates the at least one type of an orthogonal code. In some embodiments, the indication indicates at least one of the DMRS port index, a number of physical resource blocks (PRBs) for the DMRS port, the size of PRB group (PRG), a bandwidth part (BWP) for the DMRS port, a plurality of PRBs of one PRG, or a plurality of PRGs of one PRG group. In some embodiments, the communication device determines the DMRS port according to at least one of a DMRS port index, a number of physical resource blocks (PRBs) of channel for the DMRS port, a size of PRG, a bandwidth part (BWP) of channel of the DMRS port, a plurality of PRBs of one PRB group (PRG), a plurality of PRGs of one PRG group, or a DMRS pattern type of the DMRS port.

In some embodiments, the type of the orthogonal code is at least one of: in response to the number of PRBs for the DMRS port in one PRG or PRG group being odd, the type of the orthogonal code in the PRG or PRG group is 2; in response to the number of PRBs for the DMRS port in one PRG or PRG group being odd, the type of the orthogonal code in the PRG is 6; in response to the number of the PRB for the DMRS port in one PRG or PRG group being even, the type of the orthogonal code in the PRG or PRG group is 4; a first 4 REs for mapping the DMRS port using a orthogonal code of length 4; a last 2 REs for mapping the DMRS port using a orthogonal code of length 2; a last PRB in one PRG for mapping the DMRS port with a orthogonal code of length 2; a last PRB in one PRG for mapping the DMRS port with a orthogonal code of length 6; or a group of PRBs in one PRG except for the last PRB for mapping the DMRS port with a orthogonal code of length 4. In some embodiments, the indication is received in a downlink control information (DCI), and the indication includes a 1-bit value in a DCI field, or the indication includes a reserved bit associated with the DMRS port, or the indication includes a reserved bit associated with the DCI field.

In some embodiments, a physical resource block (PRB) bundling for the DMRS port is performed on at least one of: a configured bandwidth part (BWP), scheduling PRBs, a plurality of PRBs of one PRB group (PRG), or a plurality of PRGs of one PRG group. In some embodiments, an even number of PRBs are included in each PRG, wherein the DMRS port in the PRG with a first OCC of length 4. In some embodiments, a start point of the PRB bundling is a first PRB allocated to the communication device, or a first PRB in the configured BWP, or a first PRB in a PRG. In some embodiments, the DMRS port with different types of frequency division orthogonal cover code (FD-OCC) are mapped on resources in frequency domain. In some embodiments, the resources include: different physical resource block groups (PRGs), different PRG groups, scheduled PRBs for the communication device, a set of PRBs without PRB bundling, or partial resource elements (REs) on a set of PRBs without PRB bundling. In some embodiments, the DMRS port with frequency division orthogonal cover code (FD-OCC) of length of 4 on resources include any one of: puncturing on the resources, or a plurality of DMRS ports on the resources are associated with a FD-OCC of length 2 as a same DMRS port, or using associated FD-OCC of length 2.

In some embodiments, the plurality of DMRS ports on the resources associated with a FD-OCC of length 2 as a same DMRS port, an index of the DMRS port is 0 to 3 for a single symbol DMRS, or the index of the DMRS port is 0 to 7 for a double symbol DMRS. In some embodiments, an index of the DMRS port is larger than 3 for a single symbol DMRS, or the index of the DMRS port is larger than 7 for a double symbol DMRS. In some embodiments, the two values of the second OCC are associated with any two of the four values of the first OCC. In some embodiments, the two values of the second OCC are one of: first two values of the four values of the first OCC, or last two values of the four values of the first OCC. In some embodiments, the DMRS include at least one of: a type I DMRS; the DMRS port associated with FD-OCC of length 4; the DMRS port is associated with FD-OCC of length 4 indicated by a signaling.

FIG. 12 shows an exemplary flowchart for transmitting a demodulation reference signal. Operation 1202 includes transmitting, by a network device, a demodulation reference signal (DMRS) at a DMRS port, wherein the DMRS is based on at least one type of an orthogonal code.

In some embodiments, the at least one type of the orthogonal code includes a length of the orthogonal code. In some embodiments, the at least one type of the orthogonal code includes: a first orthogonal cover code (OCC) of a first length of 4, a second OCC of a second length of 2, or a third OCC of a third length of 6. In some embodiments, the at least one type of the orthogonal code is determined according to an indication transmitted in a signaling which includes at least one of a radio resource control (RRC) signaling, a medium access control-control element (MAC CE) signaling, or a downlink control information (DCI) signaling. In some embodiments, the indication indicates the at least one type of an orthogonal code. In some embodiments, the indication indicates at least one of the DMRS port index, a number of physical resource blocks (PRBs) for the DMRS port, the size of PRB group (PRG), a bandwidth part (BWP) for the DMRS port, a plurality of PRBs of one PRG, or a plurality of PRGs of one PRG group. In some embodiments, the indication is transmitted in a downlink control information (DCI), and the indication includes a 1-bit value in a DCI field, or the indication includes a reserved bit associated with the DMRS port, or the indication includes a reserved bit associated with the DCI field.

In some embodiments, a physical resource block (PRB) bundling for the DMRS port is performed on at least one of: a configured bandwidth part (BWP), scheduling PRBs, a plurality of PRBs of one PRB group (PRG), or a plurality of PRGs of one PRG group. In some embodiments, an even number of PRBs are included in each PRG, wherein the DMRS port in the PRG with a first OCC of length 4. In some embodiments, a start point of the PRB bundling is a first PRB allocated to the communication device, or a first PRB in the configured BWP, or a first PRB in a PRG. In some embodiments, the DMRS port with different types of frequency division orthogonal cover code (FD-OCC) are mapped on resources in frequency domain. In some embodiments, the resources include: different physical resource block groups (PRGs), different PRG groups, scheduled PRBs for the communication device, a set of PRBs without PRB bundling, or partial resource elements (REs) on a set of PRBs without PRB bundling.

In some embodiments, the DMRS port with frequency division orthogonal cover code (FD-OCC) of length of 4 on resources include any one of: puncturing on the resources, or a plurality of DMRS ports on the resources are associated with a FD-OCC of length 2 as a same DMRS port, or using associated FD-OCC of length 2. In some embodiments, the plurality of DMRS ports on the resources associated with a FD-OCC of length 2 as a same DMRS port, an index of the DMRS port is 0 to 3 for a single symbol DMRS, or the index of the DMRS port is 0 to 7 for a double symbol DMRS. In some embodiments, an index of the DMRS port is larger than 3 for a single symbol DMRS, or the index of the DMRS port is larger than 7 for a double symbol DMRS.

In some embodiments, the two values of the second OCC are associated with any two of the four values of the first OCC. In some embodiments, the two values of the second OCC are one of: first two values of the four values of the first OCC, or last two values of the four values of the first OCC. In some embodiments, the DMRS include at least one of: a type I DMRS; the DMRS port associated with FD-OCC of length 4; the DMRS port is associated with FD-OCC of length 4 indicated by a signaling.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A wireless communication method, comprising:
determining, by a communication device, a demodulation reference signal (DMRS) port and at least one type of an orthogonal code,
wherein the at least one type of the orthogonal code is determined based on an indication of the DMRS port received by the communication device,
wherein DMRS ports with different types of frequency division orthogonal cover code (FD-OCC) are mapped on resources in one physical resource block (PRB) in frequency domain, and
wherein the DMRS ports with different types of FD-OCC include the received DMRS port; and
receiving, by the communication device at the DMRS port, a DMRS based on the at least one type of the orthogonal code.

2. The method of claim 1, wherein the resources include:
different physical resource block groups (PRGs),
scheduled PRBs for the communication device,
a set of PRBs without PRB bundling, or
partial resource elements (REs) on a set of PRBs without PRB bundling.

3. The method of claim 1, wherein a DMRS port with frequency division orthogonal cover code (FD-OCC) of length of 4 on resources include any one of:
puncturing on the resources, or
a plurality of DMRS ports on the resources are associated with a FD-OCC of length 2 as a same DMRS port, or using associated FD-OCC of length 2.

4. The method of claim 3,
wherein the plurality of DMRS ports on the resources are associated with a FD-OCC of length 2 as a same DMRS port,
wherein an index of the DMRS port is 0 to 3 for a single symbol DMRS, or
wherein the index of the DMRS port is 0 to 7 for a double symbol DMRS.

5. The method of claim 3,
wherein an index of the DMRS port is larger than 3 for a single symbol DMRS, or
wherein the index of the DMRS port is larger than 7 for a double symbol DMRS.

6. The method of claim 5, wherein two values of a second OCC are associated with any two of four values of a first OCC.

7. The method of claim 6, wherein the two values of the second OCC are one of:
first two values of the four values of the first OCC, or
last two values of the four values of the first OCC.

8. A wireless communication method, comprising:

transmitting, by a network device, a demodulation reference signal (DMRS) at a DMRS port, wherein the DMRS is based on at least one type of an orthogonal code, wherein the at least one type of the orthogonal code is based on an indication of the DMRS port transmitted to a communication device, wherein DMRS ports with different types of frequency division orthogonal cover code (FD-OCC) are mapped on resources in one physical resource block (PRB) in frequency domain, and wherein the DMRS ports with different types of FD-OCC include the received DMRS port.

9. The method of claim 8, wherein the resources include:

different physical resource block groups (PRGs), scheduled PRBs for the communication device, a set of PRBs without PRB bundling, or partial resource elements (REs) on a set of PRBs without PRB bundling.

10. The method of claim 8, wherein a DMRS port with frequency division orthogonal cover code (FD-OCC) of length of 4 on resources include any one of:

puncturing on the resources, or a plurality of DMRS ports on the resources associated with a FD-OCC of length 2 as a same DMRS port, or using associated FD-OCC of length 2.

11. The method of claim 10, wherein the plurality of DMRS ports on the resources are associated with a FD-OCC of length 2 as a same DMRS port, wherein an index of the DMRS port is 0 to 3 for a single symbol DMRS, or wherein the index of the DMRS port is 0 to 7 for a double symbol DMRS.

12. The method of claim 10, wherein an index of the DMRS port is larger than 3 for a single symbol DMRS, or wherein the index of the DMRS port is larger than 7 for a double symbol DMRS.

13. The method of claim 12, wherein two values of a second OCC are associated with any two of four values of a first OCC.

14. The method of claim 13, wherein the two values of the second OCC are one of:

first two values of the four values of the first OCC, or last two values of the four values of the first OCC.

15. An apparatus of a communication device for wireless communication comprising: at least one processor, configured to implement a method, the at least one processor configured to cause the apparatus to:

determine, by the communication device, a demodulation reference signal (DMRS) port and at least one type of an orthogonal code, wherein the at least one type of the orthogonal code is determined based on an indication of the DMRS port received by the communication device, wherein DMRS ports with different types of frequency division orthogonal cover code (FD-OCC) are mapped on resources in one physical resource block (PRB) in frequency domain, and wherein the DMRS ports with different types of FD-OCC include the received DMRS port; and receive, by the communication device at the DMRS port, a DMRS based on the at least one type of the orthogonal code.

16. The apparatus of claim 15, wherein the resources include:

different physical resource block groups (PRGs), scheduled PRBs for the communication device, a set of PRBs without PRB bundling, or partial resource elements (REs) on a set of PRBs without PRB bundling.

17. The apparatus of claim 15, wherein a DMRS port with frequency division orthogonal cover code (FD-OCC) of length of 4 on resources include any one of:

puncturing on the resources, or a plurality of DMRS ports on the resources are associated with a FD-OCC of length 2 as a same DMRS port, or using associated FD-OCC of length 2.

18. An apparatus of a network device for wireless communication comprising: at least one processor, configured to implement a method, the at least one processor configured to cause the apparatus to:

transmit, by the network device, a demodulation reference signal (DMRS) at a DMRS port, wherein the DMRS is based on at least one type of an orthogonal code, wherein the at least one type of the orthogonal code is based on an indication of the DMRS port transmitted to a communication device, wherein DMRS ports with different types of frequency division orthogonal cover code (FD-OCC) are mapped on resources in one physical resource block (PRB) in frequency domain, and wherein the DMRS ports with different types of FD-OCC include the received DMRS port.

19. The apparatus of claim 18, wherein the resources include:

different physical resource block groups (PRGs), scheduled PRBs for the communication device, a set of PRBs without PRB bundling, or partial resource elements (REs) on a set of PRBs without PRB bundling.

20. The apparatus of claim 18, wherein a DMRS port with frequency division orthogonal cover code (FD-OCC) of length of 4 on resources include any one of:

puncturing on the resources, or a plurality of DMRS ports on the resources are associated with a FD-OCC of length 2 as a same DMRS port, or using associated FD-OCC of length 2.

* * * * *